United States Patent [19]

West et al.

[11] 3,971,426
[45] July 27, 1976

[54] APPARATUS FOR CHANGING GIANT TIRES IN THE FIELD

[76] Inventors: Vallie D. West, 724 N. Washington St.; Jesse Kennedy, 201 S. Illinois Ave., both of DuQuoin, Ill. 62832

[22] Filed: July 1, 1975

[21] Appl. No.: 592,105

[52] U.S. Cl. ............................................... 157/1.28
[51] Int. Cl.² .......................................... B60C 25/06
[58] Field of Search .................................. 157/1.28

[56] References Cited
UNITED STATES PATENTS

| | | | |
|---|---|---|---|
| 3,051,224 | 8/1962 | Pearne | 157/1.28 |
| 3,865,172 | 2/1975 | Branick | 157/1.28 X |

Primary Examiner—James L. Jones, Jr.
Assistant Examiner—James G. Smith
Attorney, Agent, or Firm—Gravely, Lieder & Woodruff

[57] ABSTRACT

An apparatus for breaking down giant tires in the field attaches to the boom of a tire service truck and includes a U-shaped frame, the spacing between the legs of which is greater than the width of the giant tire. Those legs carry hydraulic cylinders on which opposed pressing shoes are mounted. The boom of the tire truck manuevers the apparatus into a working position in which the shoes are located opposite the two sidewalls of the giant tire, whereupon the cylinders are energized. The force exerted by the shoes breaks the sealing beads on the sidewalls away from the tapered bead seats on the rim which is within the giant tire. The rim need not be removed from the vehicle with which it it utilized in order to change the giant tire.

17 Claims, 8 Drawing Figures

APPARATUS FOR CHANGING GIANT TIRES IN THE FIELD

BACKGROUND OF THE INVENTION

This invention relates in general to tire changing equipment and more particularly to a machine for breaking large tires away from their rims, particularly in the field.

Large trucks of the type used at mines and quarries as well as some earth moving equipment are often equipped with so-called giant tires which range up to nine feet in diameter. These tires when installed on their metal rims weigh over a ton each. Aside from being somewhat difficult to handle, these tires are extremely difficult to remove from the metal rims on which they are installed, at least by methods heretofore employed. Indeed, the task is extremely burdensome and time-consuming, often taking one man an entire work shift to change such a tire.

More specifically, most giant tires are of the tubeless variety and are installed on so-called five piece rims. As the name implies, these rims have five basic components, namely, a rim base, a bead seat ring fitted over one side of the rim base, a flange at the side of the rim base opposite the bead seat ring, another flange on the bead seat ring, and a lock ring to hold the bead seat ring in place. The sidewalls of the tire at their inner margins have beads which tightly embrace tapered bead seats on the bead seat ring and the rim base adjacent to the flanges thereon to form air-tight seals at those locations. After the tire has been in use for a short period of time, these seals are extremely difficult to break. Indeed, the rubber of the tire seems to almost bond to the metal of the rim at those locations.

The conventional procedure for breaking down a giant tire, that is, for breaking the tire beads away from the tapered bead seats, is to lay the tire on its side and work around it step-by-step with a ram-type breakdown tool. This tool consists of a relatively small clamp which grips the flange on the rim and forms an anchor against which a small pneumatic ram is positioned. The ram in turn carries a small contoured shoe which is forced into the space between the tire sidewall and the flange to move the bead down taper of the bead seat and thereby break it away from the bead seat. Each entry of shoe into the space between the flange and tire sidewall dislodges only a small portion of the sidewall from the bead seat since the shoe is only about 3 inches wide, and as a result, the clamp must be moved around the rim and the procedure repeated at relatively close intervals. This is time-consuming.

Not only is the ocnventional procedure for changing giant tires a time-consuming and burdensome operation, but it also can be quite dangerous for inattentive workers. Indeed, workers have been seriously injured and partially disabled as a result of having their fingers pinched between the sidewalls and rim flanges. Also, the hand tools become quite slick with oil, and unless gripped tightly they may spring loose and be propelled away from the tire with considerable force. Of course, if the operator or some other individual were in the path of the dislodged tool, a severe injury could result.

Heretofore large machines have been developed for breaking down giant tires, and these machines simplify and speed up the changing operation considerably as well as reduce the hazard. Nevertheless, the giant tire and its rim must be removed from the vehicle and transported to a shop or some other facility having a break-down machine. Unless another giant tire with a rim installed in it is available, the vehicle cannot be used until the giant tire is replaced.

SUMMARY OF THE INVENTION

One of the principal objects of the present invention is to provide an apparatus for breaking giant tires away from the rims on which they are installed in an extremely short time. Another object is to provide an apparatus of the type stated which may be used with a conventional tire truck and operated by one or two individuals. A further object is to provide an apparatus of the type stated which is simple and rugged in construction. An additional object is to provide an apparatus of the type stated which presents little hazard to the operators of it and from a safety standpoint is far superior to conventional procedures for changing giant tires. Still another object is to provide an apparatus of the type stated which is portable in the sense that it may be transported by truck to the vehicle having the defective giant tire. Yet another object is to provide an apparatus of the type stated which is capable of breaking a giant tire away from its rim without removing the rim from the vehicle. These and other objects and advantages will become apparent hereinafter.

The present invention is embodied in an apparatus including a rigid frame having spaced apart legs, pressing shoes carried by the legs, and means for reducing the spacing between the pressing shoes so as to compress the sidewalls of a tire toward each other. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
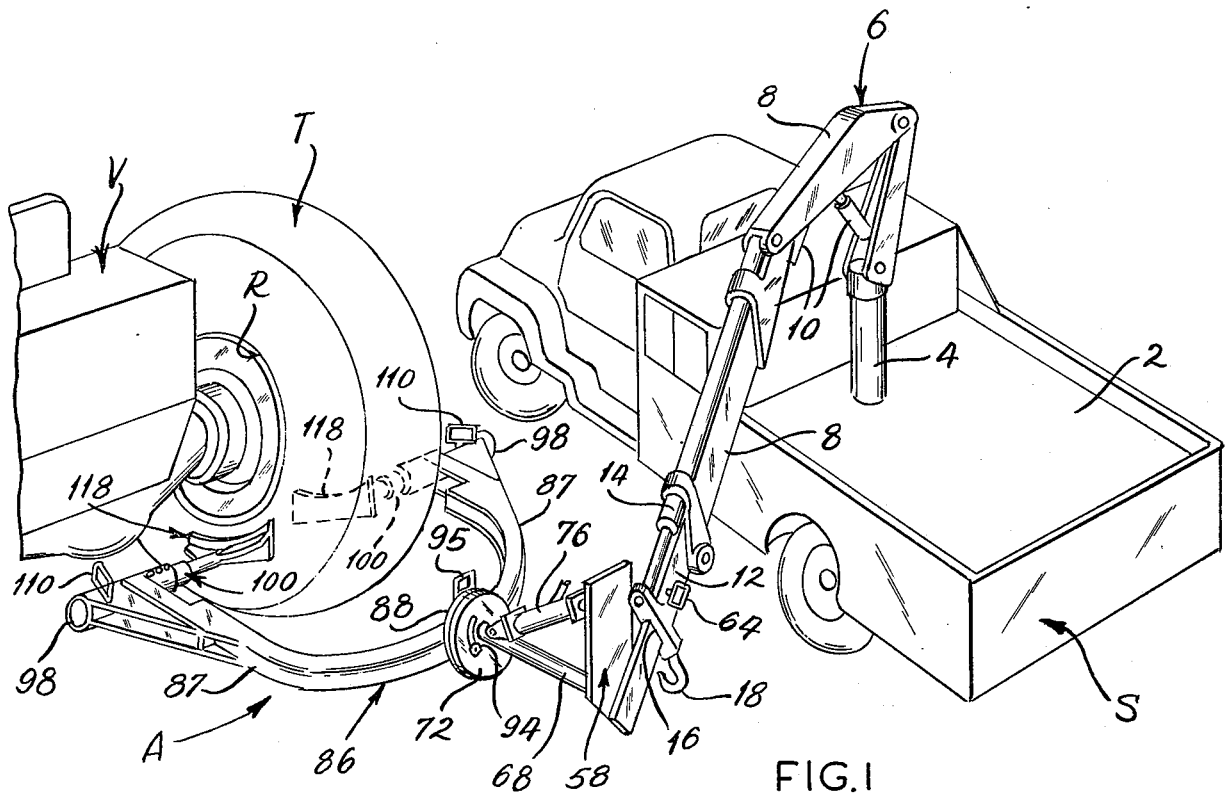
FIG. 1 is a perspective view showing the tire changing apparatus of the present invention attached to a tire service truck and in an operating position suitable for applying opposed forces to the sidewalls of a giant tire while the rim for the tire remains on its vehicle.

Referring now to the drawings (FIG. 1), A designates an apparatus for breaking a giant tire T, which may be defective in the sense that its worn out, broken, or cut, away from a rim R on which the tire T is mounted so that another giant tire T may be installed on the rim R. To change the giant tire T, the rim R need not be removed from the vehicle V of which it forms a part. On the contrary, the apparatus A is transported to the disabled vehicle V on a conventional tire service truck S, and is manuevered into position with the lifting equipment of the tire truck S.

The tire truck S (FIG. 1) has a flat bed 2 which is large enough to support the giant tire T and at the front of the bed 2 a pedestal or mast 4 projects upwardly. The mast 4 has an articulated boom 6 attached to it and composed of boom sections 8 which are positioned with hydraulic cylinders 10. The end boom section 8 carries a jib 12 which telescopes into and out of it, the jib 12 being powered by another hydraulic cylinder 14 located between it and the end boom section 8. The jib 12 has a hollow interior 16 (FIG. 4) of constant cross-sectional configuration. The jib 12 is also provided with a hook 18 so that the boom 6 may be used to lift the giant tire T as well as the apparatus A. The truck S is further provided with a suitable hydraulic system for powering the hydraulic cylinders 10 and 14, and this system is operable from a control box located at the side of the truck S. The apparatus A while being transported to the disabled vehicle is carried on the bed 2 of the service truck S, and thereafter is connected with the jib 12 of the articulated boom 6 so that it may be manuevered into working position with the boom 6.

The rim R is of the so-called five piece variety and includes five basic components (FIGS. 7 and 8), namely, a rim base 22, a bead seat ring 24 encircling one side of the rim base 22, a flange 26 encircling the other side of the rim base 22, another flange 28 encircling the bead seat ring 24, and a lock ring 30 for retaining the bead seat ring 24 on the ring 24 on the base 22. The portion of the rim base 22 which is encircled by the bead seat ring 24 has an outer groove 32 into which the locking ring 30 fits and an inner groove 34 into which an elastomeric O-ring 36 fits. The O-ring 16 is compressed between the rim base 22 and the bead seat ring 24, forming an air-tight seal between them. The locking ring 30 is split so that it can be removed from its groove 32 once the bead seat ring 34 is moved in slightly inwardly and it is prevented from jumping out of its groove 32 by a driver 38 (FIG. 6) which is driven through an apertured lug 40 projected axially from the rim base 22.

On the side opposite the bead seat ring 24 the rim base 22 has a tapered bead seat 42 (FIG. 8) which leads up to a short circumferential lip 44 against which the flange 26 is positioned. Likewise, the bead seat ring 24 on the other side of the rim base 22 also has a tapered bead seat 42 which leads up to a short lip 44 against which the other flange 28 is positioned. The two flanges 26 and 28 turn outwardly at their outer margins so that these portions of the flanges 26 and 28 are directed generally axially.

The giant tire T fits around the rim R and has (FIG. 7) a tread 46, sidewalls 48 extending inwardly from the tread 46, and sealing beads 50 at the inner margins of the sidewalls 48. The beads 50 seat against the tapered bead seats 42 forming air-tight seals at those locations. The inner portions of the sidewalls 48 bear against and are retained by the flanges 26 and 28. After the tire T has been in use, the beads 50 become firmly adhered to the tapered bead seats 42, and this bond is extremely difficult to break even when the tire T is deflated.

The tire changing apparatus A includes (FIGS. 2–4) a mount 58 composed of a bracket 60 which assumes a generally vertical disposition and a tongue 62 which projects laterally from the vertical bracket 60. The tongue 62 possesses the same general cross-sectional configuration as the hollow interior 16 of the jib 12 on the boom 6, but is slightly smaller so that it will slide easily into the hollow interior 16 of the jib 12. Both the tongue 62 and jib 12 are provided with apertures which align when the mount 58 is properly located with respect to the jib 12, and extended through these apertures is a pin 64 which secures the mounting bracket 60 to the jib 12. At its lower end, the vertical bracket 60 has a clevis 66 (FIG. 3) to which a strut 68 is connected by means of a pin 70, and the strut 68 extends generally horizontally, terminating at a circular backing plate 72. The backing plate 72 is welded firmly to the strut 68 and at the juncture of the two is a tab 74 to which the barrel of a hydraulic cylinder 76 is connected by means of a pin 78. The piston rod at the opposite end of the cylinder 76 is connected by means of another pin 78 to a tab 80 located on the bracket 60 near the top thereof. The cylinder 76 is of the double acting variety and through flexible hoses is coupled with the hydraulic system of the service truck S. Since the cylinder 76 is located oblique to the strut 68, the extension or retraction of its piston rod will change the angular disposition of the strut 68 with respect to the vertical bracket 60. The circular plate 72 at its center is provided with a circular aperture 82 (FIG. 5) which opens into the interior of the strut 68 and serves as a bearing. The plate 72 further has a pair of arcuate slots 84 which are located outwardly from the strut and are concentric to the aperture 82. The bracket 60, strut 68, and hydraulic cylinder 76 constitute the mount 58 for supporting a U-shaped frame 86.

Figure 2:
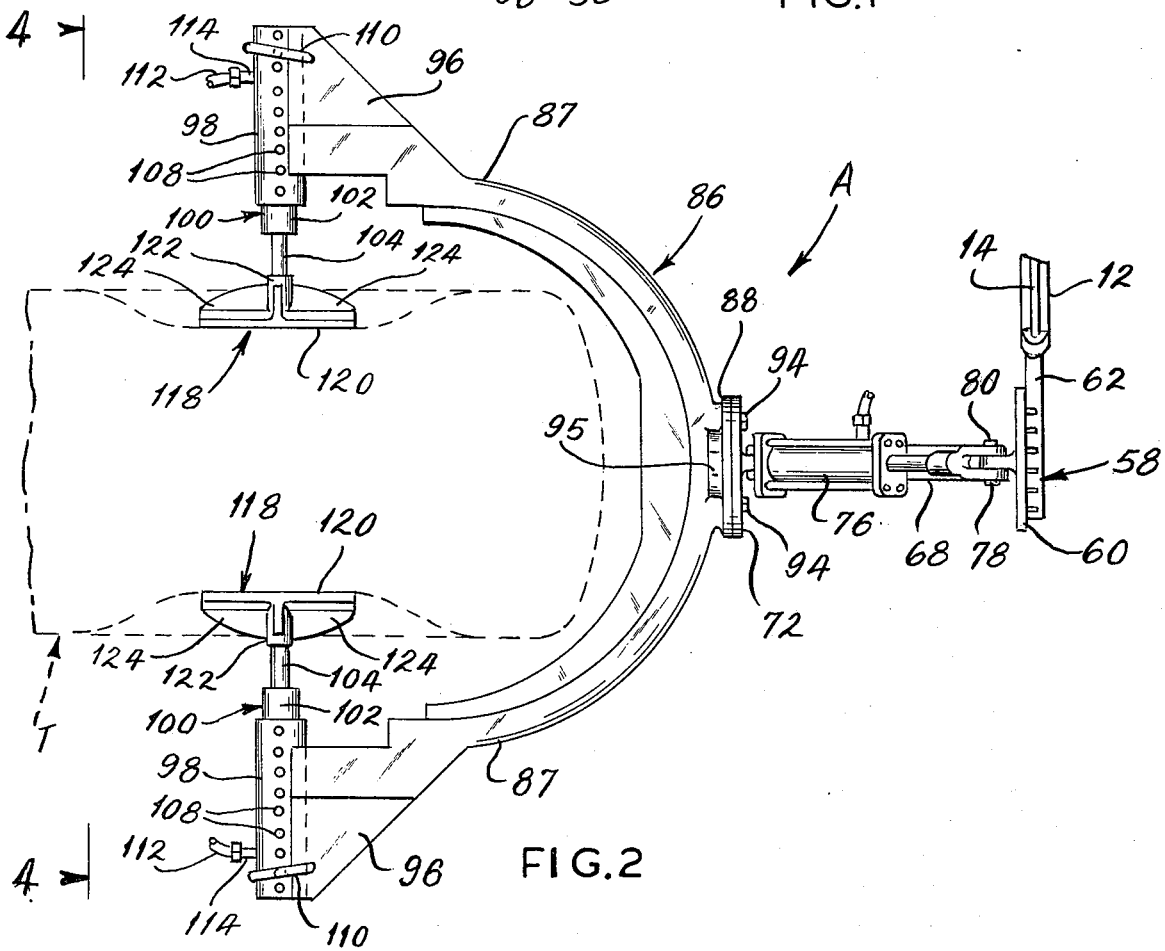
FIG. 2 is a plan view of the tire changing apparatus.
Figure 3:
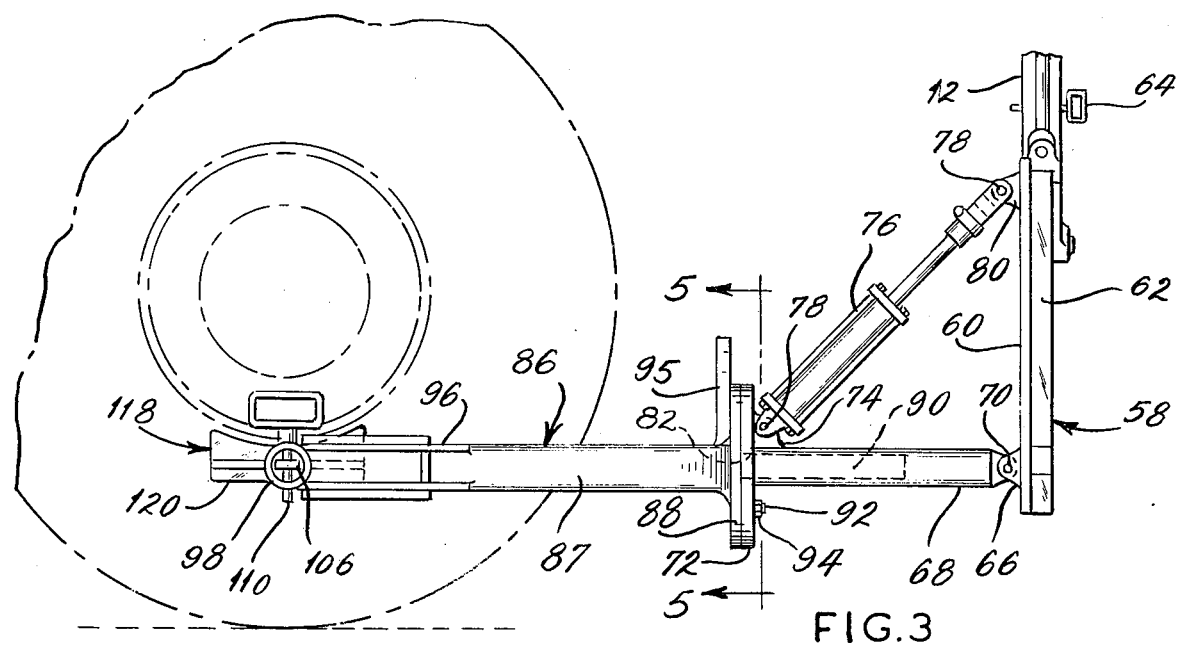
FIG. 3 is a side elevational view of the apparatus.

The U-shaped frame 86 is mounted on the circular backing plate 72 at the end of the strut 68, with the legs 87 of the frame 86 being spaced apart a distance somewhat greater than the spacing between the sidewalls 48 on the tire T (FIG. 2). The frame 86 has a circular mounting plate 88 which is located midway between the legs 87 and facing away from the ends of those legs with the plane of the plate 88 being perpendicular to the plane of the frame 86. The plate 88 abuts against the circular backing plate 72 and has a pivot pin 90 (FIGS. 3 and 5) projected axially from its center and into the circular aperture of the backing plate 72. The pin 90 projects about 18 inches into the strut 68 and forms a journal about which the pressing frame 86 may rotate relative to the mount 58. The mounting plate 88 also has a pair of threaded studs 92 (FIG. 5) projecting therefrom through the arcuate slots 84, and threaded over the studs 92 are nuts 94. When the nuts 94 are loose on the studs 92, the U-shaped frame 86 may rotate about the axis of the strut 68, which is normally horizontal, and this enables the relative elevations of the legs 87 on the frame 86 to be varied so that the frame 86 may be brought into a perfectly horizontal disposition. However, when the nuts 94 are tightened down against the backing plate 72, rotation between the two plates 72 and 88 will not occur. Welded to the other side of the circular mounting plate 88 is a lifting eye 95 which is sized to receive the hook 18 on the boom 6.

The U-shaped pressing frame 86 is quite rigid and at the ends of its legs is provided with cylinder mounts 96 (FIG. 2) having tubes 98 which open inwardly of the U-shaped configuration and are axially aligned across the space between the two mounts 96. Each tube 98 carries a single acting hydraulic cylinder 100 (FIG. 4) having a barrel 102 from which a piston rod 104 extends. The barrel 102 fits loosely in the tube 98, but is somewhat shorter than the tube 98 so that it may be moved axially therein. At its cap end, that is, the end opposite the end out of which the piston rod 104 moves, the barrel 102 is provided with an axial projection 106 having an aperture therein which will align with one pair of several longitudinally spaced pairs of apertures 108 in the side of the tube 98, depending on the axial position of the barrel 102 in the tube 98. The barrel 102 is secured in a selected axial position within the tube 98 by a positioning pin 110 which extends through a selected pair of apertures 108 in the tube 98 and also through the axial projection 106 at the cap end of the barrel 102. The hydraulic cylinder 76 is supplied with hydraulic fluid through a hose 112 which is connected to the barrel 102 at a fitting 114 located at the cap end thereof. The fitting 114 projects laterally from the barrel 102 and is accommodated by an longitudinal slot 116 in the tube 98. Thus, the fitting 114 does not prevent longitudinal movement of the barrel 102 in the tube 98, once the positioning pin 110 is pulled.

Figure 4:
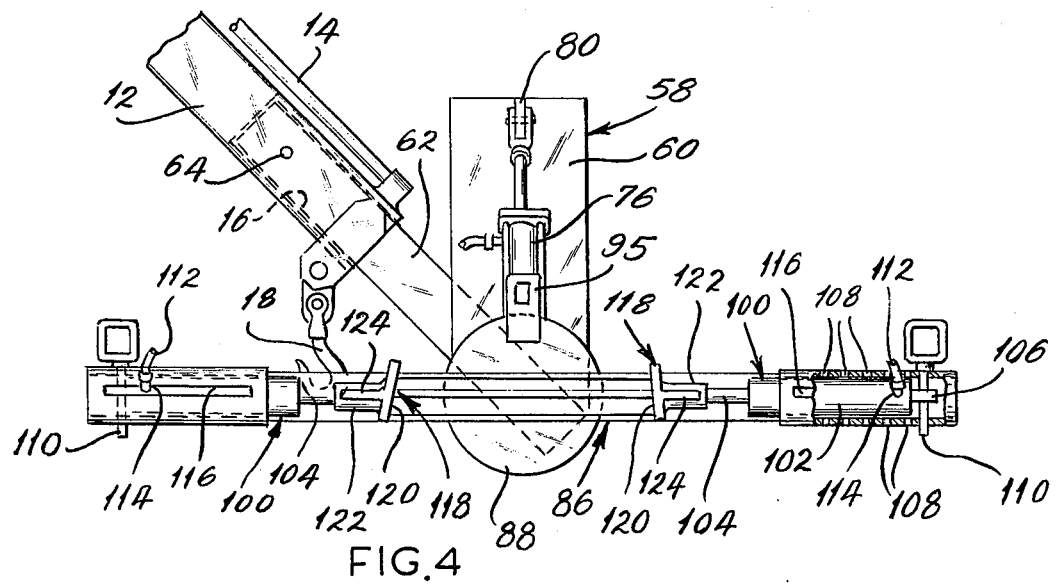
FIG. 4 is an end elevational view of the apparatus taken along line 4—4 of FIG. 2 with one of the cylinder-containing tubes being in section.
Figure 5:
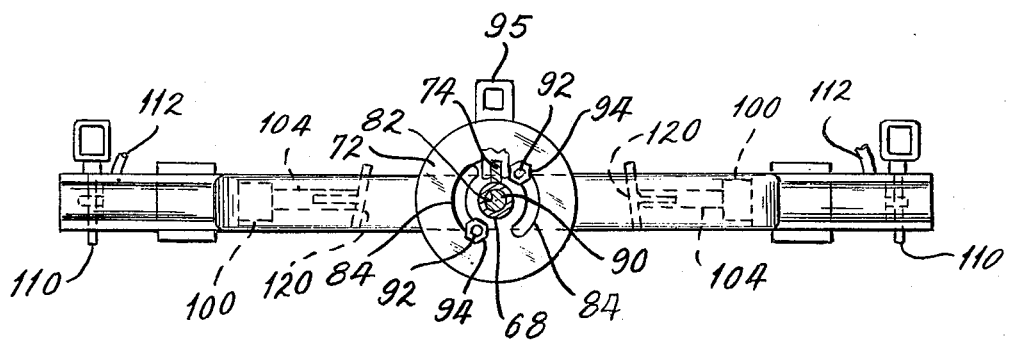
FIG. 5 is a sectional view taken along line 5—5 of FIG. 3.

The piston rod 104 of each hydraulic cylinder 100 projects beyond its tube 98 and into the space between the two legs of the U-shaped frame 86 and the end portion of the piston rod 104 has a pressing shoe 118 (FIGS. 2, 4 and 6) fitted thereon. The shoe 118 includes a flat end plate 120 having an arcuate margin which is slightly greater in radius than the rim R in the tire T. The plate 120 at its center is welded to a mounting sleeve 122 with the plane of the plate 120 being canted slightly with respect to the axis of the sleeve 122 so that the arcuate margin of the plate 120 is located slightly further inwardly than the straight margin on the opposite side of the plate 120 (FIG. 4). The sleeve 122 fits over and is secured to the end of the piston rod 102 with the mounting being such that the pressing shoe 118 may rotate relative to the barrel 102 and the cylinder mount 96 in which the barrel 102 is housed. The plate 120 is reinforced with gussets 124 which are welded to its back face and to the side of the sleeve 122.

The hoses 112 for the two hydraulic cylinders 100 are connected together into a common hose which may be in turn connected directly to the hydraulic system of the service trucks, or if no further connections into the hydraulic system are available, it may be connected to a so-called air-over-hydraulic pot which is a device for utilizing pressurized air to pump hydraulic fluid at substantial pressure. In this connection, tire service trucks are normally provided with a source of pressurized air, primarily for the purpose of inflating tires.

Figure 6:
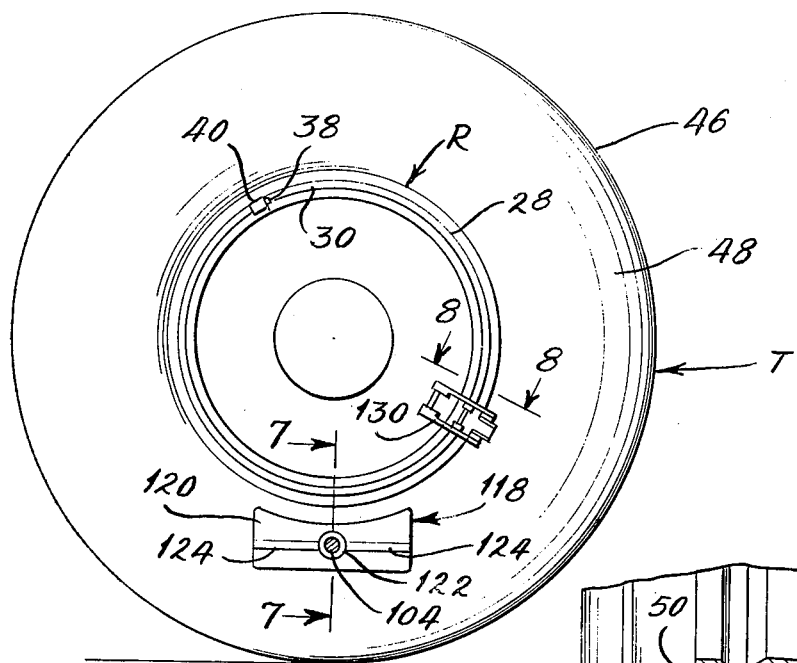
FIG. 6 is an elevational view of a giant tire showing one of the pressing shoes against the tire.
Figure 7:
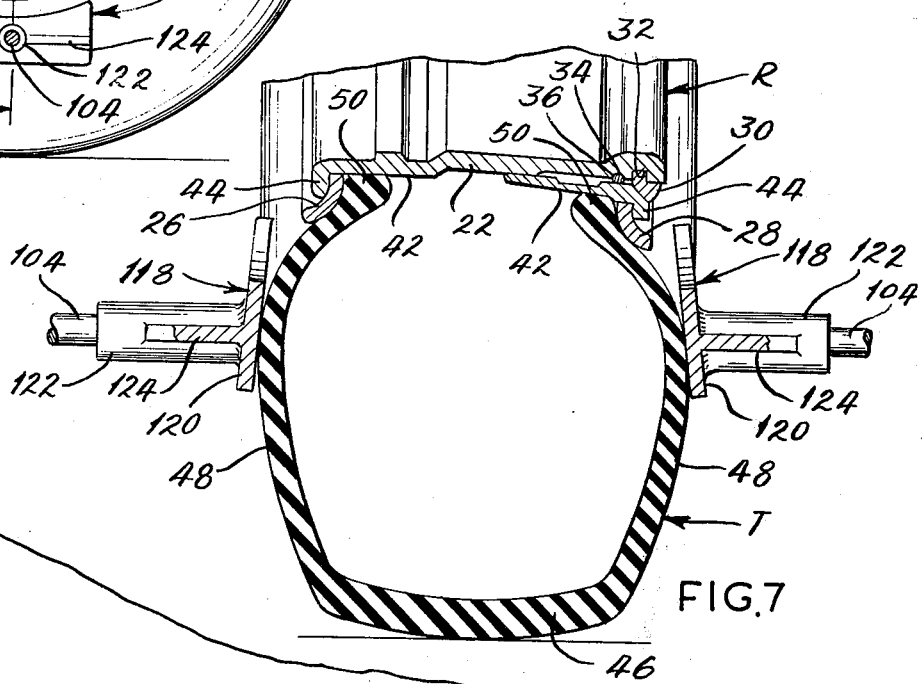
FIG. 7 is a sectional view along line 7—7 of FIG. 6.

In addition the foregoing components, the tire changing apparatus A is utilized with at least one bead ring retaining clamp 130 (FIGS. 6 and 8) which grips the flange 28 on the rim R and projects inwardly past the bead seat ring 24 and the rim base 22 to prevent the flange 28 and ring 24 from being drawn axially inwardly as a force is applied to the sidewall 48 of the tire T. More specifically, each retaining clamp 130 includes (FIG. 8) a cast body 132 having an abutment plate 134 extended over most of one side. Secured to the body at one end are a pair of fixed jaws 136 which project beyond the abutment plate 134. The fixed jaws 136 are located opposite movable jaws 138 which pivot on the body 132 and are moved toward the fixed jaws 136 by jack screws 140. The spacing between each set of fixed and movable jaws 136 and 138 when they are open is great enough to accommodate the outwardly projecting portion of the flange 28, and when the jack screws 140 are tightened, the jaws 136 and 138 tightly clamp the flange 28 (FIG. 7). In that instance, the body 132 projects radially inwardly and the abutment plate 134 is located opposite the outer end of the bead seat ring 24 and the adjacent end of the rim base 22. The bead retaining clamp 130 may be fabricated from a ram clamp used with the conventional hand-operated ram-type tool. The modification basically involves welding the abutment plate 134 to the ram clamp. Also, the clamp when so modified is installed on the rim R so that it projects inwardly and not outwardly as does a conventional ram clamp.

OPERATION

The vehicle V having the defective giant tire T will usually be rendered immobile by the condition of the tire T. The service truck T with the tire changing apparatus A on its flat bed 2 along with a replacement tire T is dispatched to the disabled vehicle.

Figure 8:
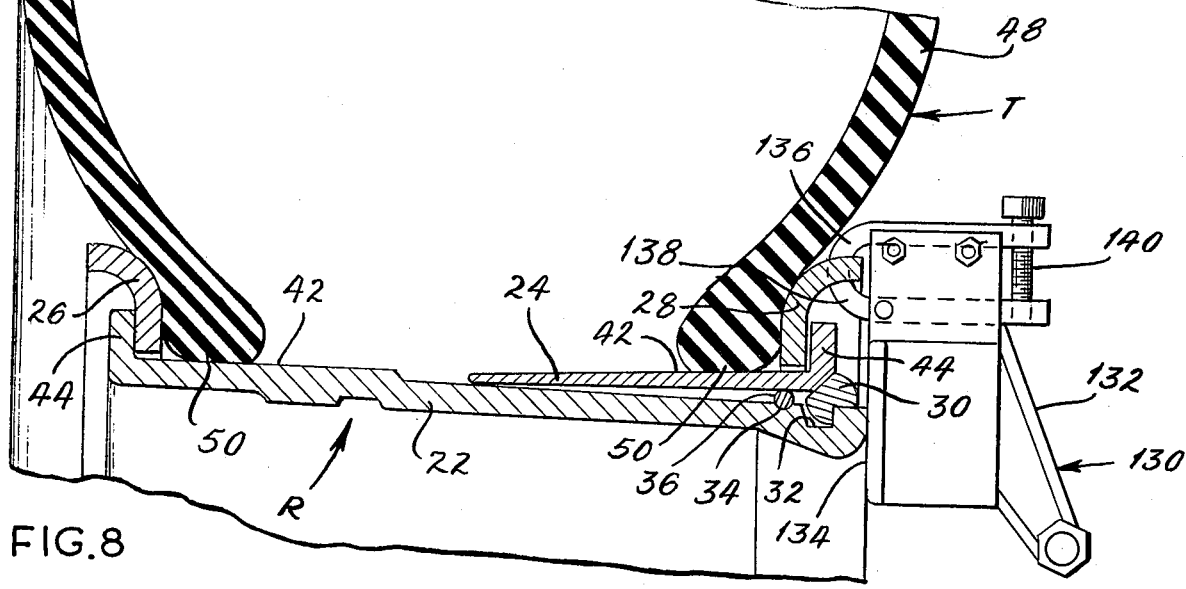
FIG. 8 is a sectional view taken along line 8—8 of FIG. 6 and showing a retaining clamp used in conjunction with the changing apparatus to retain the locking bead of the rim.

To replace the giant tire T the corner of the vehicle V at which the defective giant tire T is located is elevated with a jack sufficiently to bring the defective tire T several inches off the ground. The retaining clamp 130 is also installed on the flange 28 of the rim R such that the abutment plate 114 is projected inwardly across the locking rim 30 and the adjacent end of the rim base 22 (FIG. 8). In this regard, the lock ring 30 and flange 28 are easily accessible since they are on the outboard side of the rim R. The clamp 130 is installed by fitting the jaws 136 and 138 over the outwardly projecting portion of the flange 28, and then running the jack screws 140 down until the jaws 136 and 138 tightly grip the flange 28. When the retaining clamp 130 is properly in place, the abutment plate 134 should be against the outboard end of the rim base 22 or close to it.

Aside from the foregoing preliminary procedures, the replacement tire T is removed from the truck bed 2 by the boom 6 and likewise so is the tire changing aperture A with the latter being placed on the ground along side the service truck S. Thereupon, the hollow interior 16 of the jib 12 is aligned with the tongue 62 on the bracket 60 of the apparatus A and the jib 12 is extended by energizing its hydraulic cylinder 14. The jib 12 moves over the tongue 62 until the tongue 62 is fully received in the hollow interior 16 of the jib, whereupon the pin 64 is inserted through the aligned apertures in the jib 12 and tongue 62 to secure the apparatus A to the boom 6 (FIG. 4). To facilitate alignment, the nuts 94 at the abutting circular plates 72 and 88 should be backed off slightly so the bracket 60 will rotate with respect to the U-shaped frame 86 which rests on the ground.

The hydraulic cylinder 76 is then connected to the hydraulic system of the truck S, while the hoses 112 leading to the cylinders 100 are likewise connected to a suitable source of pressurized hydraulic fluid.

In addition, the piston rods 102 of the pressing cylinder 100 are moved to their fully retracted positions. This may be achieved simply by manually forcing the shoes 118 toward the tubes 98 in which the cylinders 100 are housed. Thereupon, the positioning pins 110 are pulled from the tubes 98, and the barrels 102 are moved outwardly to provide maximum space between the shoes 118. The shoes 118 are rotated to a generally horizontal disposition.

Next, the apparatus A is maneuvered to a position in which the plates 120 of the shoes are opposite the two sidewalls 48 of the tire T (FIG. 1). The exact position of the frame 86 in such a situation is dictated by the construction of the disabled vehicle. For most vehicles, the U-shaped frame 86 is maintained a few inches from the ground and moved forwardly from behind the disabled tire T if the tire T is a rear tire (FIG. 1) or rearwardly from in front of the tire T if the tire T is a front tire. In any event, the U-shaped frame 86 fits around the tire T so that the shoes 118 are opposite the tire sidewalls 48. When the frame 86 is correctly positioned, the shoes 118 should be located slightly outwardly from the rim R, and of course the shoes 118 should be rotated such that the arcuate margins on their end plates 120 follow the contour of the rim R (FIG. 6). In most situations, the shoes 118 will be at the lowest portion of the tire T, but this is not absolutely essential with all vehicles.

The actual maneuvering of the apparatus A is achieved by energizing the hydraulic cylinders 10 which control the boom sections 8, the cylinder 14 which controls the jib 12, and the cylinder 76 which controls the inclination of the strut 68 and the frame 86 attached to it. As the apparatus A is maneuvered into position, the nuts 94 behind the circular backing plate 72 are backed off so that the frame 86 may be rotated about the axis of its pivot pin 78 to maintain it horizontal with respect to that axis.

Once the frame 86 of the apparatus A is correctly positioned with respect to the defective tire T, the nuts 94 are tightened down against the backing plate 72, and this secures the frame 86 in a fixed position adjacent to the tire T. Then the pressing cylinders 100 are moved inwardly until the plates 120 of the shoes 118 are against or close to the sidewalls 48 of the tire T. The positioning pins 110 are inserted through the appropriate apertures 108 in the tubes 98 and the projections 106 on barrels 102 to lock the barrels 102 in the tubes 98.

Finally, the cylinders 100 are energized by pumping hydraulic fluid into the hoses 112. This drives the shoes 118 inwardly, forcing the end plates 120 thereof against the sidewalls 48 of the giant tire T. The force breaks the bonds between the sealing beads 50 and the tapered bead seats 42, and the beads 50 move inwardly over the tapered bead seats 42 to a position in which they are free of these bead seats 42, at least for about 180°. While the force applied to the outboard sidewall 48, is transmitted to the bead seat ring 24 and urges that ring inwardly, the ring 24 remains fixed in position since the retaining clamp 130 abuts against the end of the rim base 22 and thereby prevents inward movement.

Thereafter, the pressure in the barrels 102 of the cylinder 100 is released, and the sidewalls 48 expand and force the shoes 118 apart, causing the piston rods 104 to move into the barrels 102. The tire T is then rotated about 180° and the cylinders 100 are again pressurized to drive the shoes 118 against the new location on the sidewalls 48. This causes the sealing beads 50 to break away from the tapered bead seats 42 for the remaining 180° of the tire T.

Once the sealing beads 50 of the sidewalls 48 are completely dislodged, the tapered driver 38 is driven out of their apertured lugs 40 to free the lock ring 30 which is thereupon removed. Next, the bead seat ring 24 along with the flange 28 are pulled outwardly from the rim base 22. The removal of the bead seat ring 24 frees the tire T and it is merely pulled off of the rim base 22.

A new giant tire T is lifted onto the rim base 22 using the boom 6 of the service truck S, and the rim R is assembled and the new tire T inflated in the usual manner. Normally, the O-ring 36 is replaced during reassembly.

This invention is intended to cover all changes and modifications of the example of the invention herein chosen for purposes of the disclosure which do not constitute departures from the spirit and scope of the invention.

We claim:

1. An apparatus for breaking the beads on the sidewalls of a tire away from bead seats on a rim on which the tire is mounted, said apparatus comprising: a rigid frame having spaced apart legs, the spacing between which is greater than the distance between the sidewalls on the tire; a tube on the end of each leg; a pressing shoe carried by each leg with the shoes of the two legs being located directly opposite each other, the shoes being configured and positioned to bear facewise against the sidewalls of the tires; and force exerting means for reducing the spacing between the shoes so as to force the sidewalls of the tire together and thereby break the beads away from the bead seats, said force exerting means including a fluid operated cylinder housed in the tube on each leg, the cylinders being axially aligned, and means for altering the axial positions of the cylinders in the tubes.

2. An apparatus according to claim 1 in which the cylinders have barrels which fit loosely in the tubes and piston rods on which the pressing shoes are mounted, the barrels having axial projections; and wherein the means for altering the axial positions comprises pins fitted through apertures in the tubes and the axial projections, each tube having a plurality of longitudinally spaced apertures.

3. An apparatus for breaking the beads on the sidewalls of a tire away from bead seats on a rim on which the tire is mounted, said apparatus comprising: a mount connectable with a supporting structure; a rigid frame rotatable with respect to the mount about an axis of rotation and having spaced apart legs, the spacing between which is greater than the distance between the sidewalls on the tire; means for securing the frame in a fixed position with respect to the mount; a pressing shoe carried by each leg with the shoes of the two legs being located directly opposite each other, the shoes being configured and positioned to bear facewise against the sidewalls of the tires; and force exerting means for reducing the spacing between the shoes so as to force the sidewalls of the tire together and thereby break the beads away from the bead seats, said force exerting means including a fluid operated cylinder on each leg, the cylinders being axially aligned with the common axis of the cylinders being generally perpendicular to the axis of rotation for the frame.

4. An apparatus according to claim 3 wherein the frame and mount have opposed plates which facewise abut, and wherein a pivot pin extends from one plate into the other to form an axis about which the frame may rotate relative to the bracket.

5. An apparatus according to claim 4 wherein the means for securing the frame in a fixed position comprises at least one threaded stud extended from one plate through an arcuate slot in the other plate, the slot being concentric with the pivot pin, and a nut threaded over the stud, whereby when the nut is tightened down, the plates are clamped tightly together to prevent the frame from rotating relative to the mount.

6. An apparatus according to claim 4 wherein the mount includes a bracket which is connectable with the supporting structure, a strut connected with the bracket and having one of the plates thereon with the axis of rotation for the frame extending longitudinally of the strut, and means for changing the inclination of the strut with respect to the bracket about an axis which is generally perpendicular to the axis of rotation for the frame about the pivot pin.

7. An apparatus according to claim 6 wherein the means for changing the inclination of the strut is a hydraulic cylinder extended between the strut and the bracket.

8. An apparatus according to claim 3 wherein the mount comprises a bracket which is connectable with the supporting structure, a strut connected with the bracket at one end and carrying the frame at its opposite end, and means for changing the inclination of the strut with respect to the bracket.

9. An apparatus according to claim 3 wherein the mount includes a tongue which projects therefrom for engagement with a boom on a lifting apparatus.

10. In combination with a lifting device including a boom, an apparatus for breaking the beads on the sidewall of a tire away from bead seats on a rim on which the tire is mounted, said apparatus comprising: a mount connected firmly to the boom of the lifting device; a frame carried by the mount and being rotatable relative thereto, the frame having spaced apart legs with the spacing between the legs being greater than the distance between the sidewalls on the tire; a pressing shoe carried by each leg with the shoes of the two legs being located directly opposite each other, the shoes being configured and positioned to bear facewise against the sidewalls of the tire; and force exerting means for reducing the spacing between the shoes so as to force the sidewalls of the tire together and thereby break the beads away from the bead seats.

11. The combination according to claim 10 wherein the force exerting means are cylinders mounted on legs of the frame with their axes aligned, the shoes being mounted on the cylinders.

12. In combination with a lifting device including a boom, an apparatus for breaking the beads on the sidewalls of a tire away from bead seats on a rim on which the tire is mounted, said apparatus comprising: a mount connected firmly to the boom of the lifting device; a frame carried by the mount and having spaced apart legs with the spacing between the legs being greater than the distance between the sidewalls on the tire; means for changing the inclination of the frame relative to the boom about two axes; a pressing shoe carried by each leg with the shoes of the two legs being located directly opposite each other, the shoes being configured and positioned to bear facewise against the sidewalls of the tire; and force exerting means for reducing the spacing between the shoes so as to force the sidewalls of the tire together and thereby break the beads away from the bead seats.

13. The combination according to claim 12 wherein the two axes are generally perpendicular.

14. In combination with a lifting device including a boom having at least one boom section and a jib which is extendable from the boom section with the movement of the jib being generally parallel to the longitudinal axis of the boom section, the jib having a hollow portion; an apparatus for breaking the beads on the sidewalls of a tire away from bead seats on a rim on which the tire is mounted, said apparatus comprising: a mount having a tongue which is received in the hollow portion of the jib, the mount being connected firmly to the jib of the lifting device; a frame carried by the mount and having spaced apart legs with the spacing between the legs being greater than the distance between the sidewalls on the tire, a pressing shoe carried by each leg with the shoes of the two legs being located directly opposite each other, the shoes being configured and positioned to bear facewise against the sidewalls of the tire; and force exerting means for reducing the spacing between the shoes so as to force the sidewalls of the tire together and thereby break the beads away from the bead seats.

15. An apparatus for breaking the beads on the sidewalls of a giant tire away from the bead seats on a tire rim on which the tire is mounted without removing the rim from the vehicle on which it is mounted, said apparatus comprising: a mount which is connectable to a supporting structure; a U-shaped frame connected to the mount and having spaced apart legs, the frame being movable relative to the mount such that it may assume a generally horizontal disposition and such that the elevations of the legs on the frame may be varied relative to each other, the spacing between the legs of the frame being greater than the distance between the sidewalls on the tire so that the frame may be moved to a position in which the tire, while still on the vehicle, is between the two legs of the frame; a pressing shoe carried by each leg with the shoes being located opposite each other; at least one of the shoes having a substantial surface area which remains continuously oriented in a generally upright disposition and is located opposite to one of the sidewalls of the tire when the tire is in the proper position between the legs of the frame; and force exerting means for reducing the spacing between the shoes so as to cause said one shoe to bear facewise against the opposing tire sidewall while the force exerted by said one pressing shoe is resisted by an opposing force exerted by the other pressing shoe.

16. An apparatus according to claim 15 wherein the frame rotates relative to the mount about a generally horizontal axis.

17. An apparatus according to claim 15 wherein the axis of rotation for the frame bisects the legs and is generally perpendicular to the direction in which said one pressing shoe moves.

* * * * *